Feb. 3, 1925. 1,525,348
G. E. WESNER
AIR FEEDING ATTACHMENT FOR TRACTORS
Filed July 12, 1923
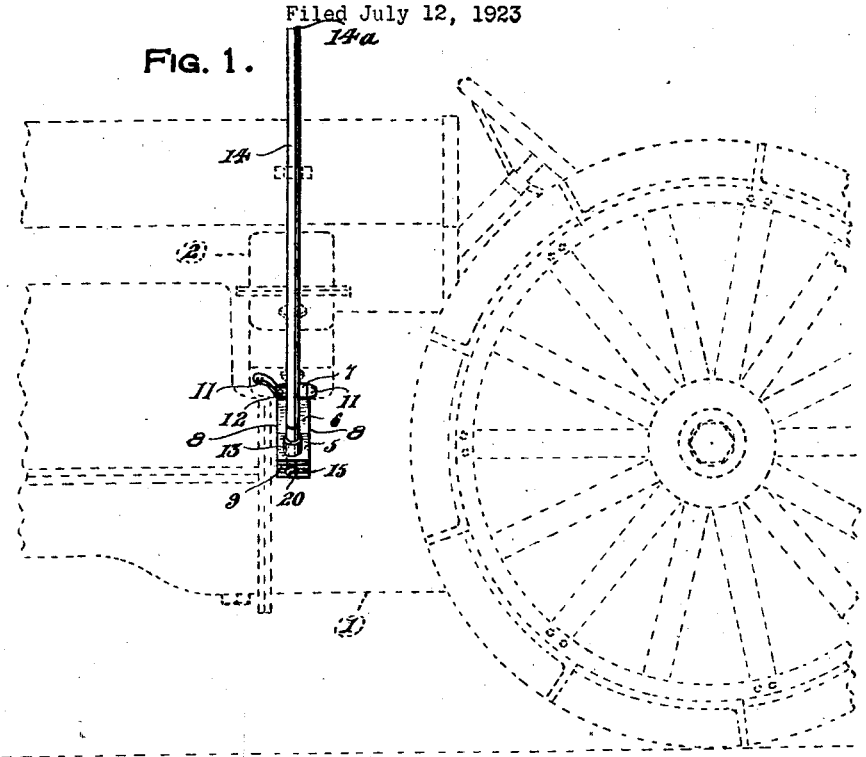
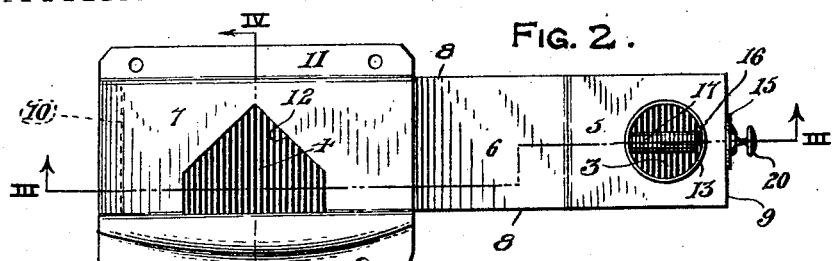
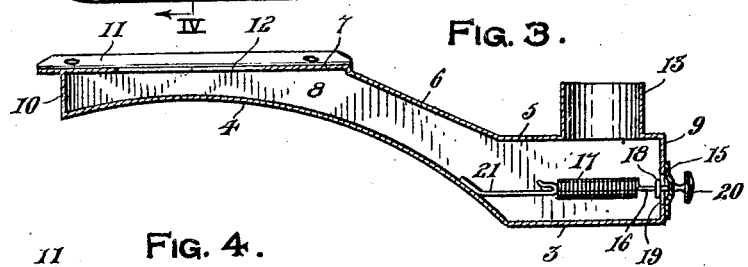
Inventor
George E. Wesner
By J. K. Bryant
Attorney Patented Feb. 3, 1925.

1,525,348

UNITED STATES PATENT OFFICE.

GEORGE E. WESNER, OF ARBUCKLE, CALIFORNIA.

AIR-FEEDING ATTACHMENT FOR TRACTORS.

Application filed July 12, 1923. Serial No. 651,110.

*To all whom it may concern:*

Be it known that I, GEORGE E. WESNER, a citizen of the United States of America, residing at Arbuckle, in the county of Colusa and State of California, have invented certain new and useful Improvements in Air-Feeding Attachments for Tractors, of which the following is a specification.

This invention relates to certain new and useful improvements in air feeding attachments for tractors and has particular reference to the idea of feeding air in a clean condition to the usual washer associated with the carbureter of a tractor gasoline engine.

The primary object of the invention provides an air feed attachment for tractors wherein a relatively long vertically disposed pipe section having its open upper end positioned above the tractor removed from the area of dust and dirt usually present adjacent the ground line during movement of the tractor with a casing associated with the lower end of the air feed pipe and usual washer for air in communication with the carbureter of the tractor.

The invention further embodies in an air feed attachment of the type above set forth, a casing designed to receive the overflow of water from the air washer with means controlling the draining of the casing when desired.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 diagrammatically illustrates by dotted lines in side elevation, a portion of a tractor equipped with the air feed attachment for the air washer that is illustrated by full lines, Figure 2 is a top plan view of the casing of the air feed attachment, Figure 3 is a longitudinal sectional view taken on III—III of Fig. 2 showing the tubular boss carried by one end of the casing upon which the air feed pipe is mounted and the tensioned valve disk controlling the draining of the casing, and Figure 4 is a cross-sectional view taken on line IV—IV of Fig. 2.

Referring more in detail to the accompanying drawing, there is illustrated by dotted lines in Fig. 1, a portion of a tractor provided with the usual air washer 2 through which air is passed in being delivered to the carbureter. The air feed attachment forming the basis of this application includes a casing having a flat bottom wall section 3 and an upwardly arched continuing bottom wall section 4, an upper wall section 5 overlying the bottom wall section 3 and an upwardly inclined upper wall section 6 as clearly illustrated in Fig. 3, the wall section 6 overlying a portion of the curved bottom wall section 4 and merging into the flat upper wall section 7 overlying the end of the curved bottom wall section 4, the upper and lower wall sections being connected by side walls 8 and end walls 9 and 10.

The casing is supported upon a convenient part of the tractor such as the crank case thereof for purposes of heating air passing through the casing, the opposite sides of the upper flat wall section 7 carrying outwardly directed flanges 11 for attachment to the tractor as illustrated in Figs. 1 and 2. When the casing is position upon the tractor, the upper flat wall section 7 thereof is disposed directly beneath and contiguous to the air washer 2, the upper wall section 7 being provided with an opening 12 in communication with the opening at the lower end of the air washer.

The upper wall section 5 of the casing carries a perpendicular tubular boss 13 that receives and supports the vertically disposed air feed pipes 14 that may be additionally braced upon the tractor body, the open upper end 14ª of the air feed pipe being disposed above the tractor and at a point considerably removed from the general area of dust and dirt around the tractor body.

In the operation of the tractor, water in the air washer 2 will discharge backwardly therefrom, due to motor pulsations, and collect in the casing, drainage means for the casing including a valve plate 15 secured to the stem 16 at one end of the coil spring 17, the stem 16 passing through a guide 18 disposed within the casing and projecting through an opening 19 in the end wall 9 with the disk valve 15 engaging the outer face of the end wall, a knob 20 carried by the outer end of the stem 16 being provided for manipulation thereof. The inner end of the spring 17 is connected to the bracket 21 secured within the casing placing the spring 17 under tension and holding the disk valve 15 upon the outer face of the end wall 9 of the casing for closing the opening 19 as will at once be obvious from an inspection of Fig. 3.

In the operation of the tractor, air for purposes of combustion is delivered to the carbureter through the air feed pipe 14 and into the casing to be heated prior to reception in the washer, oil, dust and dirt being substantially eliminated from entering the air feed pipe 14 so that air in a substantially clean and heated condition is delivered to the air washer. The pulsations of the motor, cause back splashing of the water in the air washer and a collection therof in the casing, the air being moistened thereby while the casing is drained, merely by opening the disk valve 15 to permit water to drain through the opening 19.

While there is herein shown and described the preferred embodiment of the present invention, it is nevertheless to be understood that minor changes may be made therein without departing from the spirit and scope of the invention as claimed.

What is claimed as new is:—

1. In an air feed attachment for tractor engines, the combination with an air washer, of an air feed for the carbureter having a casing secured to the crank case of said engine and communicating with the air washer, one side of said casing being concavely arcuate in the direction of its length whereby the casing extends circumferentially in contact with said crank case, and a relatively long air feed pipe carried by the casing and extending upwardly with the open upper end thereof terminating above the tractor and remote from the lower zone of dust.

2. In an air feed attachment for tractor engines, the combination with an air washer, of an air feed for the carbureter having a casing communicating with the air washer, said casing being supported on the heat radiating crank case of said engine, one side of said casing being concavely arcuate in the direction of its length whereby the casing extends circumferentially in contact with said crank case, an upwardly directed tubular boss carried by the casing and a relatively long air feed pipe carried by the casing and extending upwardly with the open upper end thereof terminating above the tractor and remote from the lower zone of dust.

3. In an air feed attachment for tractor engines, the combination with an air washer, of an air feed for the carbureter having a casing secured to the crank case of said engine and communicating with the air washer one side of said casing being concavely arcuate in the direction of its length whereby the casing extends circumferentially in contact with said crank case, a relatively long air feed pipe carried by the casing and extending upwardly with the open upper end thereof terminating above the tractor and remote from the lower zone of dust, and a valved outlet in the casing for back-splash from the air washer.

4. In an air feed attachment for tractor engines, the combination with an air washer, of an air feed for the carbureter having a casing communicating with the air washer, said casing being supported on the heat radiating crank case of said engine, one side of said casing being concavely arcuate in the direction of its length whereby the casing extends circumferentially in contact with said crank case, an upwardly directed tubular boss carried by the casing, a relatively long air feed pipe carried by the casing and extending upwardly with the open upper end thereof terminating above the tractor and remote from the lower zone of dust, and a valved outlet in the casing for back-splash from the air washer.

5. In an air feed attachment for tractor engines, the combination with an air washer, of an air feed for the carbureter having a casing secured to the crank case of said engine and communicating with the air washer, one side of said casing being concavely arcuate in the direction of its length whereby the casing extends circumferentially in contact with said crank case, a relatively long air feed pipe carried by the casing and extending upwardly with the open upper end thereof terminating above the tractor and remote from the lower zone of dust, a valved outlet in the casing for back-splash from the air washer, including an opening in an end wall of the casing and a manually operable tensioned disk valve normally closing the opening.

6. In an air feed attachment for tractor engines, the combination with an air washer, of an air feed for the carbureter having a casing communicating with the air washer, said casing being supported on the heat radiating crank case of said engine, one side of said casing being concavely arcuate in the direction of its length whereby the casing extends circumferentially in contact with said crank case, an upwardly directed tubular boss carried by the casing, a relatively long air feed pipe carried by the casing and extending upwardly with the open upper end thereof terminating above the tractor and remote from the lower zone of dust, a valved outlet in the casing for back-splash from the air washer, including an opening in an end wall of the casing and a manually operable tensioned disk valve normally closing the opening.

In testimony whereof I affix my signature.

GEORGE E. WESNER.